(12) United States Patent
Yadav et al.

(10) Patent No.: US 12,433,488 B2
(45) Date of Patent: Oct. 7, 2025

(54) SYSTEM AND METHODS FOR REAL TIME RAMAN SPECTROSCOPY FOR CANCER DETECTION

(71) Applicant: 14336186 CANADA CORP. (EXCLARO), Mont-Saint-Hilaire (CA)

(72) Inventors: Rajeev Yadav, Laval (CA); Jean-Philippe Tremblay, Montreal (CA); Rajeev Agarwal, Dollard-des-Ormeaux (CA)

(73) Assignee: 14336186 CANADA CORP. (EXCLARO), Mont-Saint-Hilaire (CA)

( * ) Notice: Subject to any disclaimer, the term of this patent is extended or adjusted under 35 U.S.C. 154(b) by 1306 days.

(21) Appl. No.: 16/962,903

(22) PCT Filed: Jan. 17, 2019

(86) PCT No.: PCT/IB2019/050409
§ 371 (c)(1),
(2) Date: Jul. 17, 2020

(87) PCT Pub. No.: WO2019/142136
PCT Pub. Date: Jul. 25, 2019

(65) Prior Publication Data
US 2023/0240538 A1 Aug. 3, 2023

Related U.S. Application Data

(60) Provisional application No. 62/618,607, filed on Jan. 17, 2018.

(51) Int. Cl.
*A61B 5/00* (2006.01)
*G01J 3/02* (2006.01)
(Continued)

(52) U.S. Cl.
CPC .......... *A61B 5/0075* (2013.01); *A61B 5/4064* (2013.01); *A61B 5/7221* (2013.01);
(Continued)

(58) Field of Classification Search
CPC ... A61B 5/0075; A61B 5/4064; A61B 5/7221; A61B 5/0042; A61B 5/7267;
(Continued)

(56) References Cited

U.S. PATENT DOCUMENTS 6,697,666 B1* 2/2004 Richards-Kortum ........................ A61B 5/0071
600/478
2004/0156854 A1* 8/2004 Mulligan ......... G01N 33/57484
435/5
(Continued)

FOREIGN PATENT DOCUMENTS

CN 104541153 B 4/2015
CN 104605853 B 10/2018
(Continued)

OTHER PUBLICATIONS

Yu (Feature Selection for High-Dimensional Data: A Fast Correlation-Based Filter Solution.; Proceedings of the Twentieth International Conference on Machine Learning (ICML-2003), Washington DC, 2003) (Year: 2003).*

*Primary Examiner* — Alexei Bykhovski
(74) *Attorney, Agent, or Firm* — Smart & Biggar LP; Carmela De Luca

(57) ABSTRACT

Provided are Raman systems and methods for detection of cancerous tissues in tumor margins in real time during surgical procedures. The systems include a laser excitation source, a probe, a spectrometer and a camera specifically designed for use of Raman spectroscopy in real time during surgery. The inventive methods pertain to quality assessment of Raman data, comparison of obtained Raman data against (Continued)

known biomarkers and classification of tissue as cancerous or non-cancerous on the basis of corresponding Raman data. The systems and methods allow for previously unavailable detection and classification of tissue with Raman spectroscopy in real time surgical applications, including the identification of cancer sub-types.

14 Claims, 15 Drawing Sheets

(51) Int. Cl.
  *G01J 3/44* (2006.01)
  *G01N 21/65* (2006.01)
(52) U.S. Cl.
  CPC ............... *G01J 3/0218* (2013.01); *G01J 3/44* (2013.01); *G01N 21/65* (2013.01)
(58) Field of Classification Search
  CPC .... G01J 3/0218; G01J 3/44; G01J 3/28; G01J 3/2803; G01N 21/65; G01N 33/574
  See application file for complete search history.

(56) References Cited

U.S. PATENT DOCUMENTS

| | | | |
|---|---|---|---|
| 2010/0145200 | A1 | 6/2010 | Mahadevan-Jansen et al. |
| 2012/0035442 | A1 | 2/2012 | Barman et al. |
| 2014/0201126 | A1* | 7/2014 | Zadeh ................... A61B 5/165 706/52 |
| 2015/0335248 | A1* | 11/2015 | Huang ................. A61B 5/0084 702/19 |
| 2017/0020460 | A1* | 1/2017 | Leblond ............... A61B 5/4842 |

FOREIGN PATENT DOCUMENTS

| | | | |
|---|---|---|---|
| CN | 107045593 B | | 11/2018 |
| EP | 2302359 A1 | | 3/2011 |
| EP | 2870462 B1 | | 5/2015 |
| ES | 2847230 T3 | | 8/2021 |
| WO | 2011036267 A2 | | 3/2011 |
| WO | 2012035442 A2 | | 3/2012 |
| WO | 2013103475 A2 | | 7/2013 |
| WO | WO2017019988 | * | 7/2016 |
| WO | WO2019080013 | * | 10/2017 |
| WO | 2022034536 A1 | | 2/2022 |

* cited by examiner

SYSTEM AND METHODS FOR REAL TIME RAMAN SPECTROSCOPY FOR CANCER DETECTION

CROSS-REFERENCE TO RELATED APPLICATIONS

This is a U.S. National Stage of International Application PCT/IB2019/050409, filed Jan. 17, 2019, which claims the benefit of U.S. Provisional Application No. 62/618,607, filed Jan. 17, 2018.

FIELD OF THE INVENTION

The present invention relates to the use of Raman spectroscopy systems and methods for cancer detection. Specifically, the invention may pertain to the use of Raman systems and methods for detection of cancerous tissues in tumor margins in real-time during surgical procedures. Inventive systems include an arrangement comprising a laser excitation source, a probe, a spectrometer and a camera whereby the optics of the probe are specifically designed for Raman collection in the surgical context and the camera is adapted for the known limitations of Raman applications. Various inventive methods of data quality assessment, feature extraction and classification can be applied to the Raman system so that known source of contaminants of Raman data can be removed, Raman data can be assessed against known Raman biomarkers and subsequent classification of the Raman data can be achieved. Most specifically, the present invention relates to a system and methods by which Raman spectroscopy can be deployed in real-time applications during cancer surgery to assess tumor margins and other tissues in a manner that filters out known contaminants from the Raman data, compares the obtained Raman data against known biomarkers and classifies the subject tissue as cancerous or non-cancerous and may additionally classify the subject tissue according to sub-types of cancerous tissue.

BACKGROUND OF THE INVENTION

Despite advances in the surgical management of brain tumors (and other tumor types), achieving optimal surgical results and identification of tumor remains a challenge. Raman spectroscopy, a laser-based technique that can be used to non-destructively differentiate molecules based on the inelastic scattering of light, is being applied toward improving the accuracy of brain tumor surgery. Recently, many studies have been published to examine the accuracy of Raman spectroscopy in distinguishing brain tumor from normal tissues and to map the spectra of different brain tissue types. However, these studies are limited or inconclusive due to insufficient data samples and lack of standard classification algorithms or guidelines for what constitutes a good Raman Spectra. There exist no measures that allow the comparison of the quality of spectra across measurements both intra and inter subject as well as across measurement conditions.

Raman spectra are classically modeled as a linear mixing of spectra of molecular constituents of the analyzed sample. However, physical distortions due to the instrumentation and biological nature of samples add linear and nonlinear contaminants to the Raman spectra model. These distortions are dark current, detector and optic responses, fluorescence background, peak misalignment and peak width heterogeneity. Design of a supervised classification algorithm in presence of these distortions leads poor classification accuracy. Additionally, high dimensionality of highly variable intra and inter subject heterogenous data sets from varying biological origins can pose a significant challenge for machine learning techniques.

In addition to the above, there are multiple additive distortions that contaminate Raman spectra. These include spectral saturation, cosmic ray interference, ambient light interference, high background noise, and low Raman signal levels. Current Raman approaches do not include methods for filtering out these distortions to allow for real-time use in surgical settings Many current Raman spectroscopy methods employ the full Raman spectra for training a classification algorithm. This leads to poor classification accuracy due to the level of noise in the non-significant portions of the Raman spectra in addition to the aforementioned contaminants. For any one specific tissue type classification, there exists a subset of Raman spectral features that are most relevant and using these features to train a classification algorithm can lead to greatly enhanced classification accuracy. A supervised learning model like a support vector machine can then be used to classify the Raman data.

Accordingly, there is a need for a Raman system that employs methods of data quality assessment, feature extraction and supervised learning models that lead to relevant extracted Raman features being assessed against known Raman biomarkers to arrive at accurate classifications of cancer and normal tissue. An inventive system consisting of novel methods at each stage, for real-time applications, are presented herein to satisfy the cancer detection needs.

DETAILED DESCRIPTION OF THE INVENTION

The present invention is now described in detail in connection with its various embodiments and with reference to the attached figures.

Figure 1:
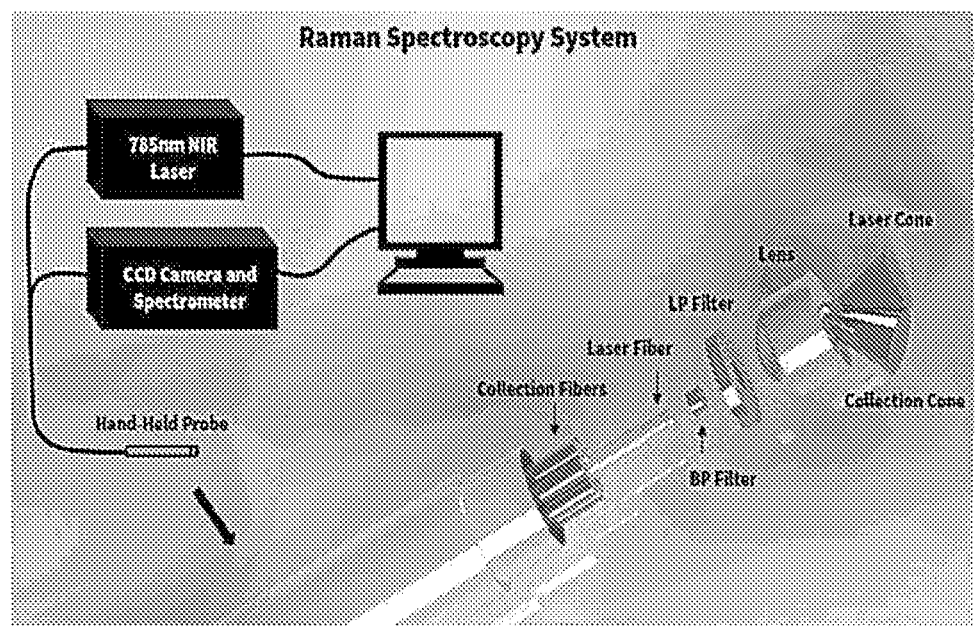
FIG. 1 shows an inventive Raman spectroscopy system adapted for use with the inventive methods.

A system according to the present invention consists of a hand-held probe, a spectrally stabilized laser light source, emitting in the near-infrared (NIR) at 785 nm (Innovative Photonic Solutions, NJ, USA), a custom spectrometer and detection system consisting of a high speed, high-resolution charge-coupled device (CCD) (ANDOR Technology, Belfast, UK) and a data processing module consisting of laptop or a PC. The data processing module is responsible for controlling the light source, CCD and processing the acquired Raman data, classifying the sampled tissue and providing an interface to the clinician. A representative embodiment is shown in FIG. 1. The representative inventive embodiment of FIG. 1 is capable of acquiring and processing Raman data, classifying sampled tissue and presenting a classification answer (e.g., cancer/no cancer) to a clinician in real-time during surgery. In this context, real-time means a practically instantaneous classification that does not interfere with surgeon workflow, most ideally 100's of ms to perhaps just over 1 second.

In one embodiment, the probe has seven 300 um core collection fibers. A donut-shaped long-pass filter blocks excitation laser light but allows the sample Raman shift wavelengths to be passed to the collection fibers. These seven fibers surround a stainless-steel tube containing the laser delivery fiber assembly. The excitation laser light delivery fiber is a 200-micron core fiber with a small band-pass filter positioned in front of it to remove the Raman signal induced in the excitation fiber. The two-piece converging front lens is made of a Plano convex 2 mm diameter curvature sapphire back portion (the high refractive index bends the light sharply), with a flat front portion of 1 mm thick Plano magnesium fluoride.

Figure 2:
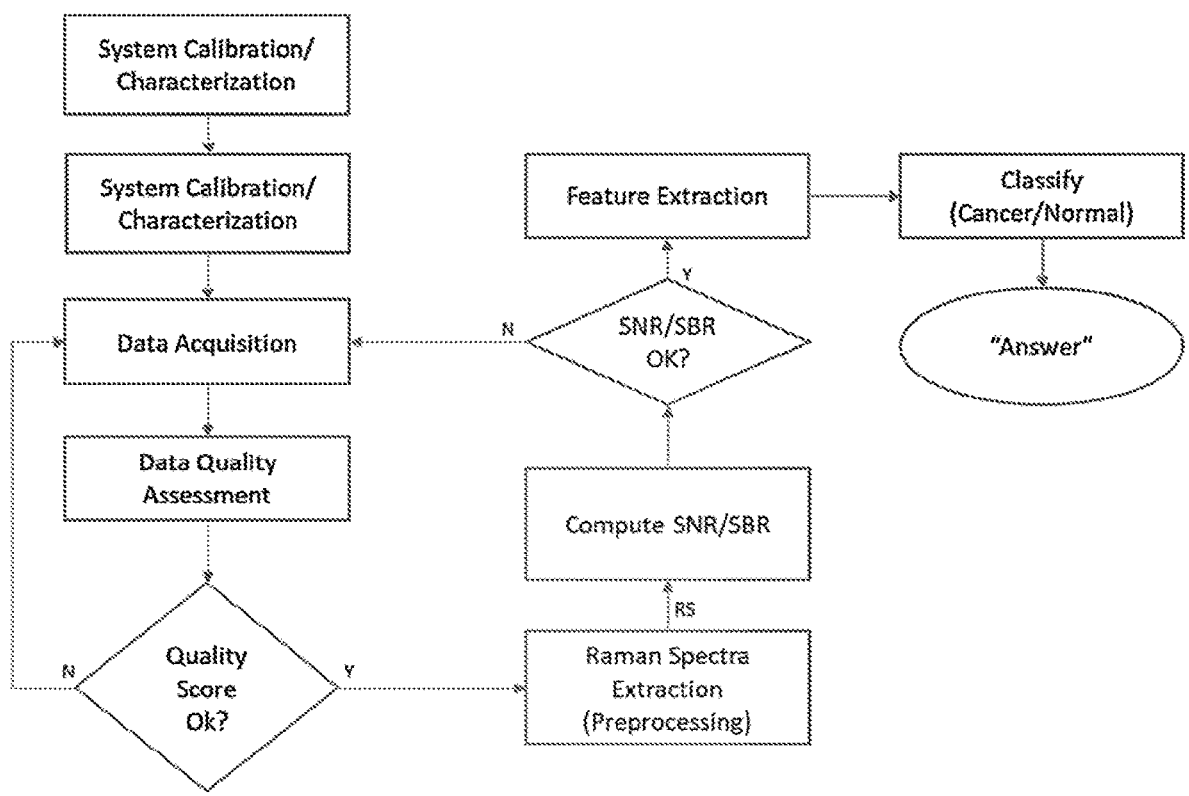
FIG. 2 is a block diagram showing data processing and quality assessment steps according to a method of the present invention.

Raman Spectroscopy is a technique that uses the energy of inelastically scattered photons in response of a material excited with a monochromatic light source. The energy levels of the scattered photons are shifted in wavelengths as the excitation light source interacts with different vibrational modes of the material molecules. As such, Raman spectra so generated can provide insights into the molecular composition of materials. Unlike the much more commonly used Rayleigh (elastic) scattering, Raman spectral intensity is typically a million times lower, therefore, the use of Raman Spectroscopy for tissue classification requires careful data acquisition and processing considerations. FIG. 2 describes one possible workflow of the Raman based inventive cancer detection/tissue classification system. The classification system represented in FIG. 2 would be deployed using a hardware embodiment such as the representative embodiment of FIG. 1 and would be capable of real-time classification decisions (e.g., cancer/no cancer) during surgery, once the system is calibrated.

In reference to FIG. 2, at the start of each case, the system must be calibrated and characterized to allow inter-patient comparisons by the classification stage. Since each data or tissue type may require a different processing and classification scheme, it is necessary to select the data/tissue type being considered. The data acquisition block allows for the system to interrogate the tissue with a monochromatic light and collect the scattered light as Raman data. Data quality assessment allows the collected Raman data to be filtered and assessed for usability in extracting the Raman Spectra. If the quality of the acquired Raman data is not sufficiently good, the data is rejected, and the measurement is reacquired. Here, a key aspect of this invention are a set of data quality assessment algorithms that can perform in real-time. In the Raman Spectra Extraction or the Preprocessing block, signal processing algorithms are applied to extract the Raman Spectra from the acquired Raman data. The extracted Raman Spectrum is further processed to evaluate Signal-to-Noise Ratio (SNR) and other metrics to determine the applicability of the Raman Spectra for classification of tissue type. Evaluation of the SNR is performed with the application of a novel SNR definition that can be applied on a single realization of Raman Spectra. One of the key components of the inventive system is the extraction of appropriate features from the Raman Spectra to allow data dimensionality reduction and classification for tissue classification.

Data Acquisition

As described earlier, the Raman data acquisition operation consists of exciting the tissue with monochromatic light and collecting the multi-wavelength scattered light with a spectrometer as Raman data. The light is captured with a CCD image sensor. The CCD image is manipulated to achieve a spectral acquisition using a technique known as binning. It is a process of combining spatially adjacent pixels to increase the SNR and allow faster readouts from the CCD. However, by integrating across spatial pixels, prior to analog-to-digital conversion, we run the risk of exceeding the dynamic range of the CCD. Additionally, Raman data response to excitation laser power or the exposure time is highly variable across different measurement sites and tissue types. Thus, a fixed excitation laser power or exposure time is not suitable for optimal Raman Spectra acquisition. To address this, we have developed a novel strategy that aims at adaptively adjusting the excitation laser power or the exposure time to maximize the CCD dynamic range without creating a saturation condition.

Figure 3:
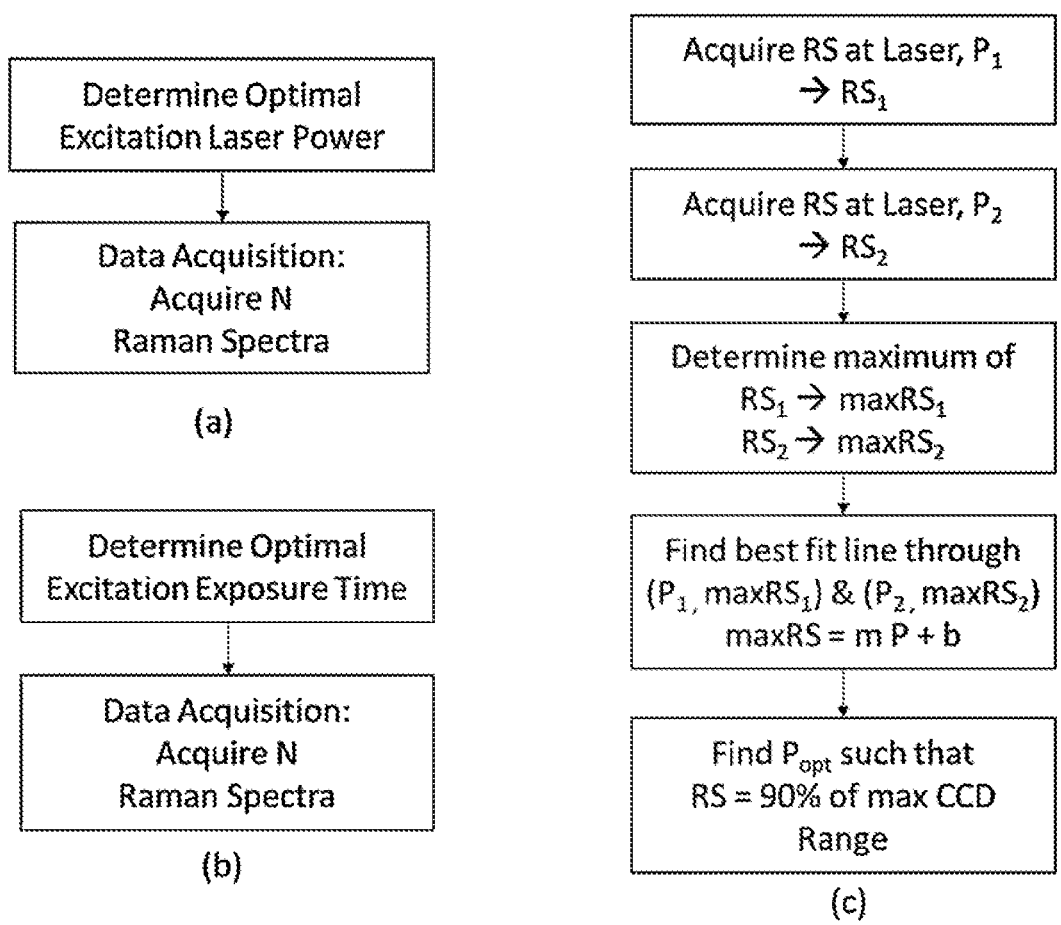
FIG. 3 is a block diagram showing use of a data acquisition algorithm to optimize laser excitation power.

In reference to FIG. 3(a) and A(b), for each Raman measurement, the data acquisition algorithm first aims to determine the optimal excitation laser power (and/or excitation exposure time) for the considered measurement site. The resulting optimized collection parameters are used to collect N Raman measurements. FIG. 3(c) shows one possible scheme for optimizing the excitation laser power. Main concept here is to make Raman measurements at two relatively low excitation laser power, $P_1$ and $P_2$. For each measurement determine the maximum measured intensity as $maxRS_1$ and $maxRS_2$. By using these two measurement pairs it is possible to extrapolate and determine the optimal excitation laser power $P_{opt}$, such that the maximum measured intensity is 90% of allowable Spectrometer/CCD dynamic range. The best fit line through points ($P_1$, $maxRS_1$) and ($P_2$, $maxRS_2$) can be described as:

$$maxRS = m \cdot P + b$$

where m and b are the slope and the y intercept of linear fit. In a similar way it is possible to optimize the excitation laser exposure time.

Data Quality

Raman data consists of the Raman response of the tissue (Raman Spectra) along with a multitude of contaminants.

Figure 6:
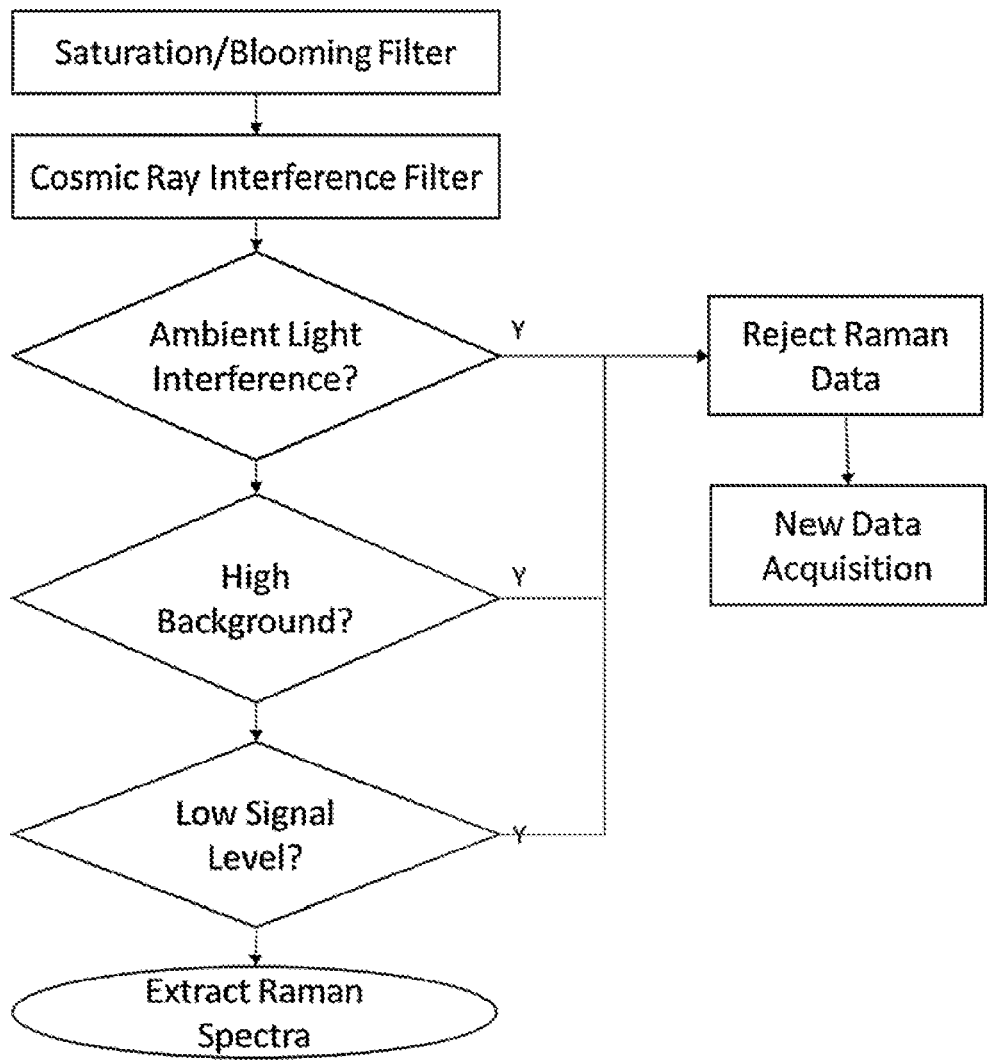
FIG. 6 is a block diagram showing steps for Raman data quality assessment.

Therefore, in this data quality assessment step, it is essential that the collected data meet strict quality specification before it can be considered for Raman Spectra Extraction. FIG. 6 provides the sequence filters and tests that the data must satisfy to pass the data quality assessment. Saturation detection allows for any one or more of the signals within a measurement to be identified and rejected if the saturation test fails. Remaining signals are processed to remove the effect of any Cosmic Ray interference. Resulting signals are tested to see if a strong ambient light contamination is present. On detection of any such interference, the Raman data quality is set to poor and the data is rejected from further processing and the measurement is redone. In the last two steps of the data quality assessment, the measurement is tested for high background levels and low signal levels. If either is true, the data is deemed poor quality and the Raman measurements are redone. A key inventive aspect of the data quality assessment algorithms is the simplicity in computations to be applicable in real-time scenario. In our application, it is essential that the data must be of sufficiently good quality before Raman Spectra can be extracted.

Extracting Raman Spectra
Saturation/Blooming

Saturation or blooming is a phenomenon that occur in all charge-couple devices (CCD) image sensors under conditions in which either the finite charge capacity of individual photodiodes, or the maximum charge transfer capacity of the CCD, is reached. Once saturation occurs at a charge collection site, accumulation of additional photo-generated charge results in overflow, or blooming, of the excess electrons into adjacent device structures. Many potentially undesirable effects of blooming may be reflected in the sensor output, ranging from white image streaks and erroneous pixel signal values to complete breakdown at the output amplification stage, producing a dark image.

Based on the analog-to-digital conversion (ADC) bit resolution, the saturation or blooming is defined as binned spectra reaching the maximum of the ADC resolution. We have developed a novel algorithm technique to prevent spectral saturation by adaptively determining the optimal laser excitation power and tissue/CCD exposure time for a tissue measurement site under investigation. In spite of controlling saturation levels during the data acquisition stage, it is still possible for saturation to be present in isolated cases. This is largely due to the high variability of the Raman response of varying tissue types. Hence, the need for CCD saturation detection. In its simplest form, we employed a threshold to detect any Raman measurement that may exceed the dynamic range of the CCD. All such measurements are considered not usable and the acquisition is repeated.

Cosmic Ray Interference

Cosmic rays are commonly observed in Raman instruments utilizing CCD detectors. They can disturb or even destroy the meaningful chemical information expressed by normal Raman spectra. Cosmic rays can randomly occur in Raman as well as the dark background measurements. While the cosmic rays can have properties similar to Raman peaks, it is observed that they tend to exhibit very sharp activities of varying amplitudes and do not occur in consecutive measurements. We use the above Cosmic Ray properties to identify and remove these artifacts.

Figure 4:
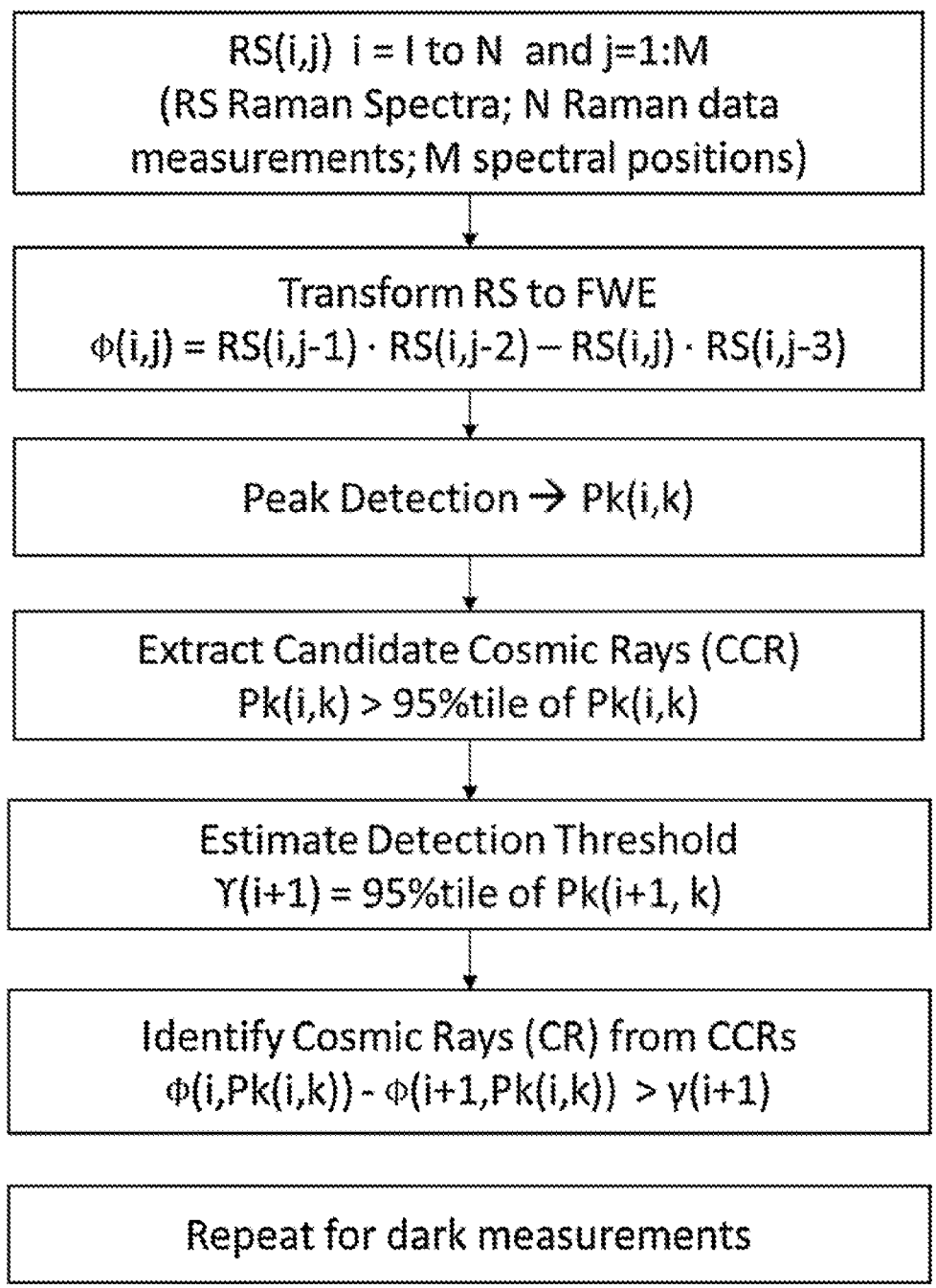
FIG. 4 is a block diagram showing a framework for identifying cosmic ray artifacts.

With reference to FIG. 4, the following describes the general framework to identify cosmic ray artifact. Each measurement consists of N Raman measurement, RS at M spectral values (wavenumbers). First step in the Cosmic Ray (CR) detection is the non-linear transformation of the RS using the Teager Operator $$\Phi(i,j)=RS(i,j-1)\cdot RS(i,j-2)-RS(i,j)\cdot RS(i,j-3)$$

One of its many properties is the tendency to enhance sharp-spike like activity such as CRs. This is a weighted we use a non-linear energy operator called the Teager operator. Peak detection is performed for each transformed RS i.e., for each $\Phi(i,j)$ for i=1: N. For each i, the resulting Pk(i,k), candidate CRs (CCRs) are identified as all peaks which are greater than 95 percentile. Since it is expected that CRs occur randomly, we compare the intensity of each CCR(i,k) for the given (i) against the peak in the subsequent RS ($\Phi(i,k)$) at the same spectral location. If the current peak intensity is greater than a some threshold, then CCR(i,k) is considered to be a CR detection. In one implementation of this algorithm we use 95% of peak intensities as the threshold. The identified CRs can be eliminated by replacing the RS at the spectral location by a cubic-spline interpolated value.

Ambient Light Interference

Figure 5:
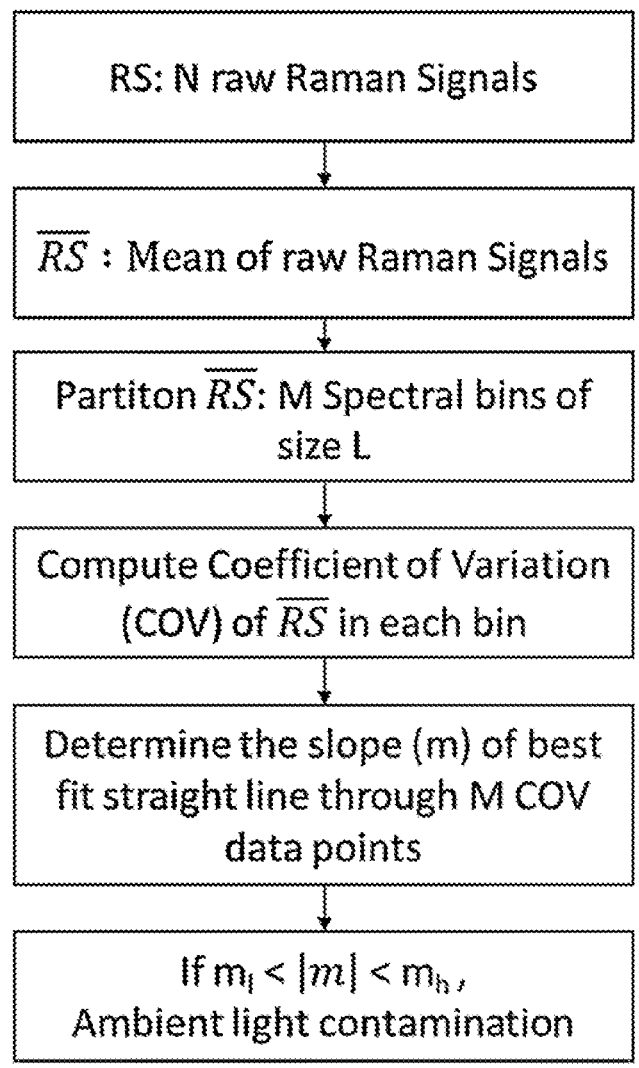
FIG. 5 is a block diagram showing the use of an algorithm for identifying ambient light contamination.

Light from the environment often contaminates Raman measurements that are not made in complete dark environment as in the operating theatre. The ambient light can consist of room lighting, overhead lamps, lights from monitors, among other light sources. Requiring a complete dark environment for Raman measurement is during intraoperative spectral acquisition is impractical and will not be acceptable to the clinical professionals. As a minimum requirement, the overhead lamps are pointed away from the field-of-view during Raman acquisitions. However, this does not necessarily resolve other ambient light contaminations and often relegates such measurement to be of little value and as such must not be considered for analysis. To identify the ambient light contamination, we have developed the following algorithm as shown in FIG. 5. Mean raw Raman measurement (from N raw measurements) are partitioned into M spectral bins of length L. For the amplitude data in each bin the coefficient of variation (COV) is determined. Best fit straight line is fitted through the resulting set of COVs. After considerable experimental evaluation, we have determined that the slope is expected to be negative in absence of ambient light interference but positive in the its presence. Hence, comparison of g the slope to empirically determined thresholds allows us to detect ambient light interference.

High Background Detection

A dark background spectrum is the measurement made when no laser excitation light is applied to the sample. These data are used to correct baseline offset, system noise and fixed pattern noise that may be present in the Raman measurement. In addition to these, we also observed another source of noise that originates from the environment. In our case, from the operating room (OR) lights. These lights are not turned off during the surgery but are pointed away from the field-of-view to reduce its impact on the Raman spectra. We examine the intensity height of the dark background measurement. The height is compared to an empirically determined threshold to detect high background interferences. All such measurements are excluded from further processing.

Low Signal Intensity

Raman measurement is shot noise limited in our system that is defined by the acquisition parameters. Therefore, there must be a minimum intensity count on the CCD to qualify as sufficiently good acquisition for further processing. For the raw Raman measurement, we acquire a corresponding dark measurement (measurement without the excitation laser light). As a first step, the dark measurement is removed from raw Raman signal. Subsequently, the maximum of the resulting signal is compared to apriori determined threshold (experimentally determined for the given system and acquisition parameters) to assess signal level integrity.

Raman Spectra Extraction (Preprocessing)

Raman Spectra is extracted from the measured signal with the help of several preprocessing modules. These include auto-fluorescence removal, instrument response correction, spectral normalization and smoothing. The resulting spectra is the Raman Spectra of the tissue/sample under investigation. Important aspect of the preprocessing step is the determination of the quality of the extracted Raman Spectra. The method to accomplish must be simple for real-time application. The following provides two new schemes to quantify the Raman Spectra Quality—Signal-to-Noise Ratio (SNR) and Signal-to-Background Ratio (SBR).

Signal to Noise Ratio (SNR)

The Raman biomarker assessment allows us to evaluate the quality of Raman measurements, particularly from biological tissues. Generally, the Raman signal-to-noise ratio (SNR) is defined as the ratio of the Raman peak height to the standard deviation of the peak height.

$$SNR(j) = \frac{\mu(j)}{\sigma(j)}$$

where j corresponds to the spectral index and $\mu(j)$=mean and $\sigma(j)$=standard deviation of the Raman Spectra at the $j^{th}$ spectral location. Due to the very definition, it is not possible to assess Raman SNR during online application without N measurements. Present invention provides a novel scheme for assessing Raman Signal SNR $$SNR_{Raman}^{(j)} = \frac{C\sqrt{n\tau lR^{(j)}}\, r^{(j)}}{\sqrt{r^{(j)} + a^{(j)} + \frac{2l^{(j)}}{I}}}$$

where
- C is an empirical constant that is to be characterized for the detection component (CCD) of the spectrometer for the mode of operation;
- n is the number of individual spectra that are being averaged to form the final spectrum;
- $\tau$ is the acquisition time for an individual spectrum, in milliseconds;
- l is the laser power delivered to the sample, in milliwatts;
- $R^{(j)}$ is the normalized system response, which can be obtained from a system calibration standard such as the NIST 2241 material;
- $l^{(i)}$ is the $j^{th}$ spectral band of the normalized ambient light signal's contribution on the measurement. It is obtained by performing a tissue sample measurement without the excitation (dark measurement), so that the light collected at the surface of the sample is solely the ambient light signal. This measurement is then normalized by the exposure time, the laser power, the normalized system response and the detector gain;
- $a^{(j)}$ is the $j^{th}$ spectral band of the normalized auto-fluorescence signal's contribution on the measurement. It is obtained by estimating the line shape of the auto-fluorescence signal with an automated polynomial regression algorithm post normalization by the exposure time, the laser power, the normalized system response and the detector gain;
- $r^{(j)}$ is the $j^{th}$ spectral band of the normalized Raman signal's contribution on the measurement. It is obtained by subtracting $a^{(j)}$ from the measurement being normalized by the exposure time, laser intensity, system response and camera gain; The above novel SNR definition provides a measure of signal quality at a specific spectral location. We use this definition for determining the overall mean SNR (SNR):

$$\overline{SNR}_{Raman} = \frac{1}{k}\sum_{J \in j} SNR_{Raman}^{(J)} = \frac{C\sqrt{n\tau l}}{k}\sum_{J \in j}\frac{\sqrt{R^{(J)}}\, r^{(J)}}{\sqrt{r^{(J)} + a^{(J)} + \frac{2l^{(J)}}{I}}}$$

where J corresponds to a subset of spectral bands corresponding to the most relevant key Raman Spectral bands (peaks) corresponding to the task and type of tissue sample being characterized. One example may be the spectral features used for normal vs cancerous human brain tissue classification or simply the top 10% of all peaks in the Raman Spectra. More importantly this definition can be applied during real-time signal acquisition allowing the determination of quality of Raman measurement.

Signal to Background Ratio (SBR)

Figure 7:
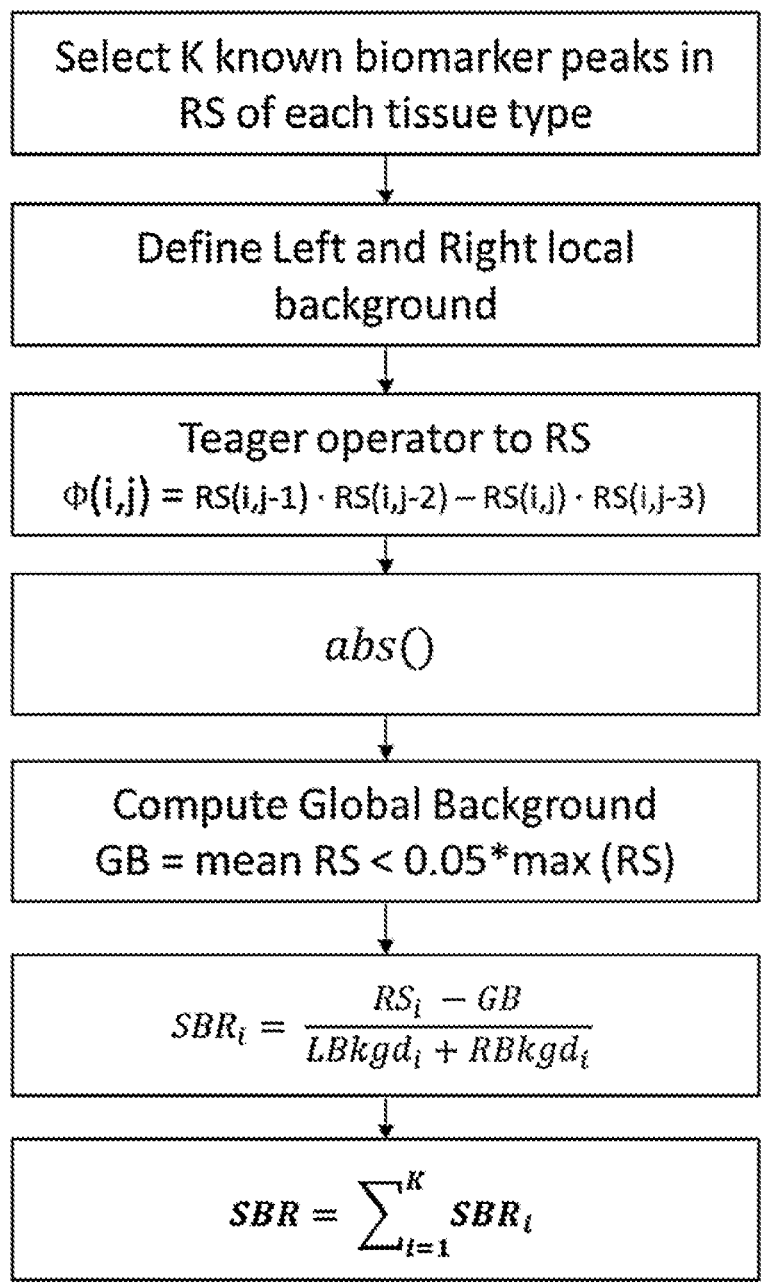
FIG. 7 is a block diagram showing computation of Raman signal-to-background ratio.

Raman signal-to-background ratio is fast to compute with the use of the non-linear Teager Operator. FIG. 7 illustrates the Raman Spectra and the corresponding output of the Teager Operator. An important aspect of this operator is the ability enhance Raman peaks while suppressing baseline wander. FIG. 7 illustrates the set of operations that must be performed to obtain a metric describing the Signal to Background Ratio. For a given tissue type being analyzed, we first select a set of key biomarker Raman peaks. FIG. 4 illustrates some key peaks that tend to be present in brain tissue as well as constituent molecules that are largely responsible for these peaks. With reference to FIG. 7, knowing the location of the relevant Raman peaks allows us to define the local background to the left and right of each peak. Based on data acquired in multiple scenario that included human brain, lung tissue and animal tissues (chickbone and muscle, blood, beef-muscle, kidney, liver and veal brain), we experimentally determined suitable definition of background spectral locations. Typically, these were around 20-spectral locations (pixels) on left and right side of each peak. Teager's Non-linear transformation is performed on the Raman Spectra. Global Background (GB) is computed as the mean of all spectral values that are below 5% of the maximum RS value. $SBR_i$ for each peak is computed as the GB corrected RS energy of $i^{th}$ peak and the mean of local background energy defined by $LBkgd_i$ and $RBkgd_i$. Overall SBR is the mean of individual $SBR_i$'s.

In accordance with FIG. 2, the SNR and SBR metric are compared to a threshold. Based on our extensive data analysis and the ground truth of what constitutes a good or bad spectrum, we have experimentally defined thresholds for these two metrics. Only spectra that meet the set cut-off thresholds are considered high quality Raman Spectra and used in the subsequent feature extraction and classification schemes.

Feature Extraction

Usually, the first step in any machine learning is to explore the statistical properties of the data to determine qualitatively and quantitively how the data is related to a response variable. This first exploratory step often reveals that many of the features reflecting the data may be irrelevant and redundant that can lead to classifier over-fitting and increased computational burden. Thus, there is an immediate need to find subset of features that best describe the data in concordance with the associated response label, reduce dimensionality and improve overall classification performance. Feature selection is a combinatorial optimization problem, composed of a selection criterion and a search strategy, improving prediction performance, and reducing the problem of data dimensionality.

In the Raman spectroscopy literature, mostly, the full spectrum is utilized in machine learning tissue classification. The use of full spectrum may lead to over-fitting and poor statistical models for the prediction. As part of this overall invention, we have developed an unsupervised method of mining spectral peaks and bands that may be most relevant for tissue classification as Normal or Cancer. The automatically identified spectral bands, when compared to manually identified peaks and bands, map one-to-one with the manually identified expected peaks/bands.

We employ statistical bootstrapping technique to identify these Raman biomarkers. Bootstrapping is a technique that utilizes random sampling with replacement. In each sample pool, we utilize a set of informatic theoretic feature selection techniques to identify the spectral bands that may be suitable for tissue classification.

Figure 11:
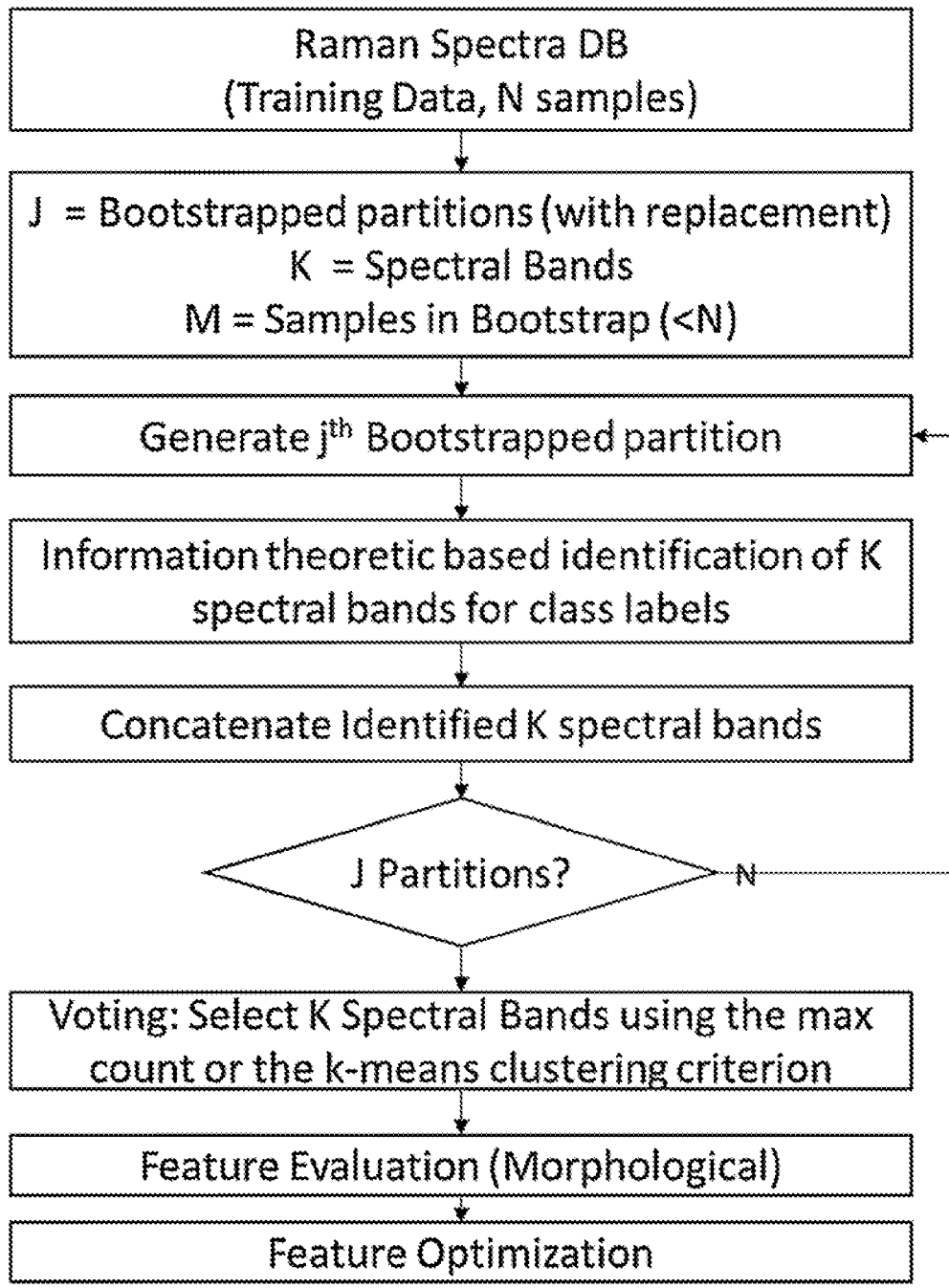
FIG. 11 shows a block diagram of feature extraction steps according to a method of the present invention.

A block diagram of one possible embodiment of technique to identify Raman Spectral bands that may be relevant for classification are shown in FIG. 11. The training data consisting of as N Raman Spectra that are labeled as Normal or Cancer. Bootstrapping technique with replacement is used to sample the training data to generate $j^{th}$ partition. Size of the partitioned data is set to M (<N) with J partitions. The number of spectral bands is selected to be K. Each bootstrap partition, multiple (L) information-theoretic based criteria (described below) are used to identify K most dominant spectral bands that maximize the conditional likelihood of the data classes given the spectra (intensity) and labels. Each iteration of the bootstrapping step results in a reduced set of data points of length Kx1. By repeating this process for L criterion, we obtain L spectral band vectors, $\vec{FV}_{mRMR}$, $\vec{FV}_{MIM}$, $\vec{FV}_{CMIM}$, ... $\vec{FV}_{FCBF}$ that can be concatenated to yield $\vec{FV}_j$ (K·Lx1)

$$\vec{FV}_j U \vec{FV}_{mRMR}, \vec{FV}_{MIM}, \vec{FV}_{CMIM}, \ldots \vec{FV}_{FCBF} \qquad (4.8)$$

Figure 12:
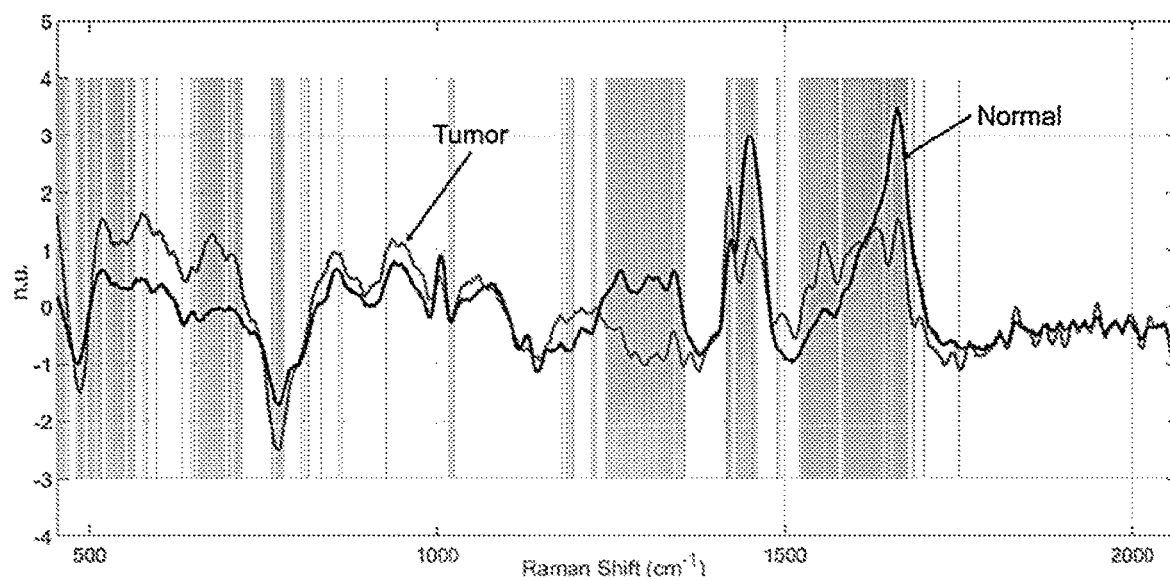
FIG. 12 shows a graphical representation of Raman feature labels according to a feature extraction method of the present invention.
Figure 13:
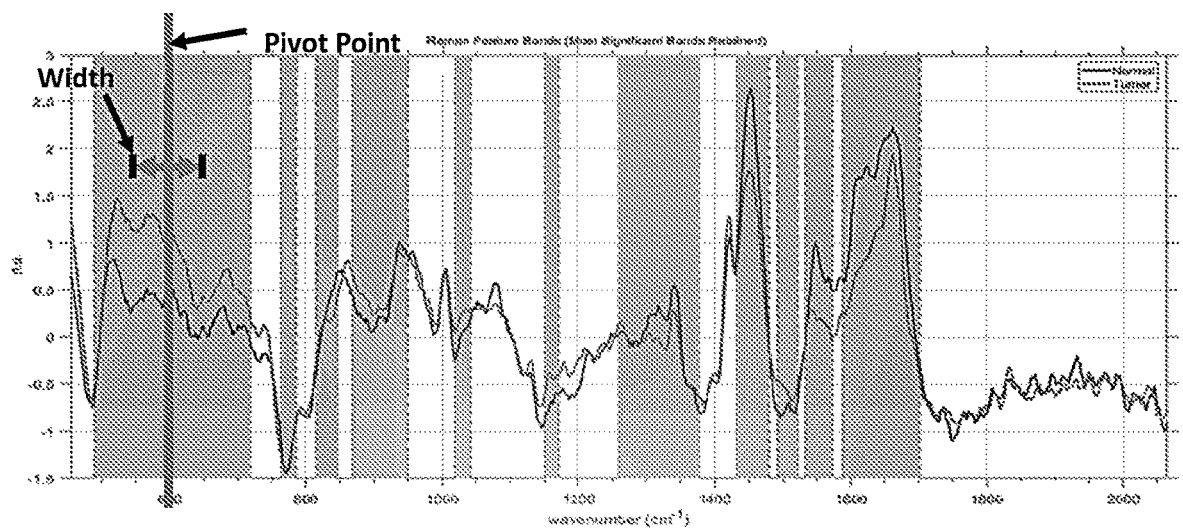
FIG. 13 shows a graphical representation of unsupervised detection of Raman biomarker features according to a method of the present invention.
Figure 14:
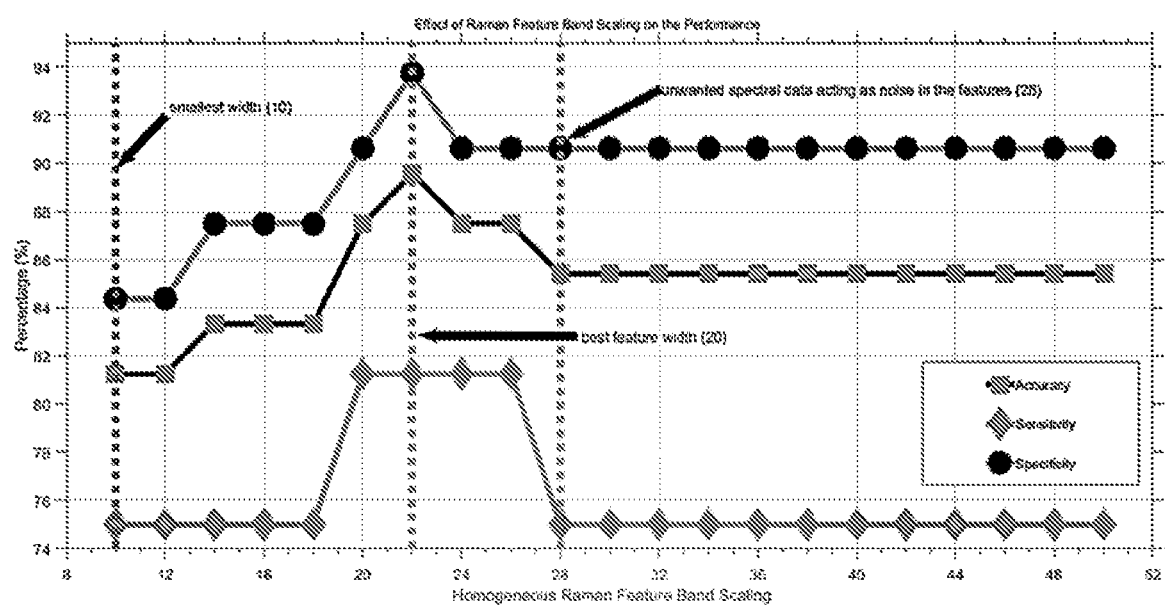
FIG. 14 shows a graphical representation of a performance analysis of a Raman feature extraction method of the present invention.

The process is repeated for J bootstrap partitions. At each iteration, the identified spectral bands are concatenated with those of previous iteration to yield a matrix F of size J×(K·L). Following the final iteration, voting is used to select the K most occurring spectral bands for feature calculation. In the simplest implementation, Raman intensity at each of the identified spectral location is used as a feature vector of K-elements for classification. In one implementation, we selected K=300 spectral bands with J=50 bootstrapped iterations. FIG. 12 depicts the outcome of this feature extraction from one of the training datasets.

Max-Relevance Min-Redundancy (MRMR): The idea in MRMR technique is to find a feature set S with m features $\{x_i\}$ for the data D, which jointly have the largest dependency on the target class c. Max-Relevance is to search features satisfying:

$$\max D(S, c), D = \frac{1}{|S|} \sum_{x_i \in S} I(x_i; c) \qquad (4.1)$$

which approximates D(S,c) with the mean value of all mutual information values between individual feature $x_i$ and class c. It is likely that features selected according to Max-Relevance could have rich redundancy, i.e., the dependency among these features could be large. When two features highly depend on each other, the respective class-discriminative power would not change much if one of them were removed. Therefore, the following minimal redundancy (Min-Redundancy) condition can be added to select mutually exclusive features:

$$\min R(S), R = \frac{1}{|S|^2} \sum_{x_i, x_j \in S} I(x_i; x_j) \qquad (4.2)$$

The criterion combining the above two constraints is called "minimal-redundancy-maximal-relevance" (mRMR).

Mutual Information Maximization (MIM): The most trivial form of feature selection consists of a uniform random subsampling without repetition. Such an approach leads to features as independent as the original but does not pick the informative ones. This leads to poor results when only a small fraction of the features provides information about the class to predict. To avoid the main weakness of the random sampling, MIM technique picks the K features n (1), . . . , n(K) maximizing individually the mutual information with the class to predict. Selection based on such a ranking does not ensure weak dependency among features and can lead to redundant and poorly informative families of features.

The mutual information l (x; y) is defined by $$I(x;y) = H(x) - H(x|y) \qquad (4.3)$$

which indicates that the information delivered from x to y equals the reduction of uncertainty of y when x is known.

Conditional Mutual Information Maximization: Conditional mutual information is the difference between the entropy of random variables U when W is known and the entropy of U when V are W are both known. This formula tells how much information V carries about U which is not carried by W.

$$I(U;V|W) = H(U|W) - H(U|W, V) \qquad (4.4)$$

The Conditional Mutual Information Maximization (CMIM) Method [24] is an algorithm that selects a small subset of features that carries as much information as possible based on conditional mutual information mentioned above. To be specific, the ultimate goal of CMIM would be to choose v(1), . . . , v(K) which minimize $$\hat{H}(Y|X_{v(1)}, X_{v(2)}, \ldots X_{v(k)}) \qquad (4.5)$$

H (Y|X) is the conditional entropy Y given X of two random variables X and Y. Also, v (1) . . . v(K) are the number of the variables we select from the whole set of variables.

Fast Correlation Based Filter: The fast correlation-based filter (FCBF) method addresses explicitly the correlation between features. It first ranks the features according to their mutual information with the class to predict and remove those which mutual information is lesser than a threshold d.

In a second step, it iteratively removes any feature $X_i$ if there exist a feature $X_j$ such that equation 4.6 and 4.7 are satisfied.

$$l(Y, X_j) \geq l(Y, X_i) \tag{4.6}$$

$$l(X_i, X_j) \geq l(X_i, Y) \tag{4.7}$$

i.e. $X_j$ is better as a predictor of Y and $X_i$ is more like $X_j$ than to Y. The threshold d can be adapted to get a good set of bands that retain maximum information.

Observation of experimental data suggests unique morphological traits in the spectra of different tissue types. These morphological features could aid in improving classification. In addition to the spectral intensity, in the feature evaluation step, we have also considered some morphological traits such as number of spike-like peaks within a given band, area-under the spike peak, slope of left and right side of the spike peaks etc. This is applicable to feature bands where feature bands are defined as group of adjacent spectral locations identified above. Certain anomalies in the Raman spectra may originate from the system itself or the biology. Such anomalies must not be included as part of features in the machine learning algorithm. The final step in feature extraction is optimization. In this step, we aim to manually exclude bands/peaks that clearly do not parameterize the tissue under investigation. For example, we would want to exclude features in the in the Raman spectra that may correspond to blood.

Collectively, the Raman peaks, Raman bands, Raman morphological features are defined as Raman biomarker. In one embodiment of the spectrometer it is possible to reduce the width of the significant bands. Reducing the redundancy and quantity of Raman biomarkers can aid in addressing the classifier over-fit problem when the available training is restricted in quantity.

Figure 8:
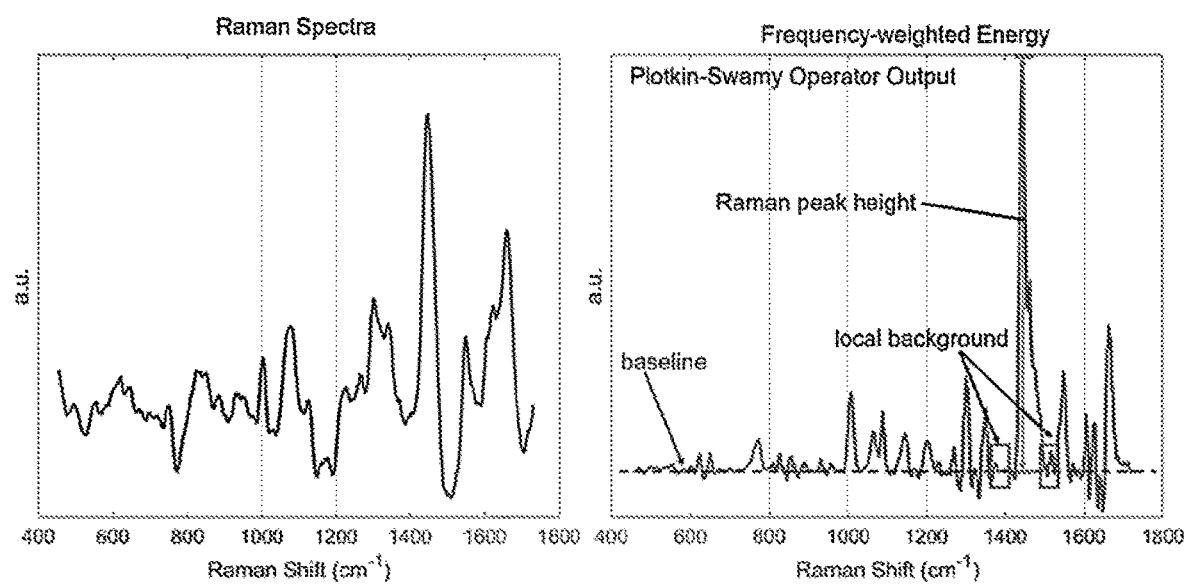
FIG. 8 shows a graphical representation of a Raman spectra and its frequency-weighted energy output according to a method of Raman biomarker assessment of the present invention.
Figure 9:
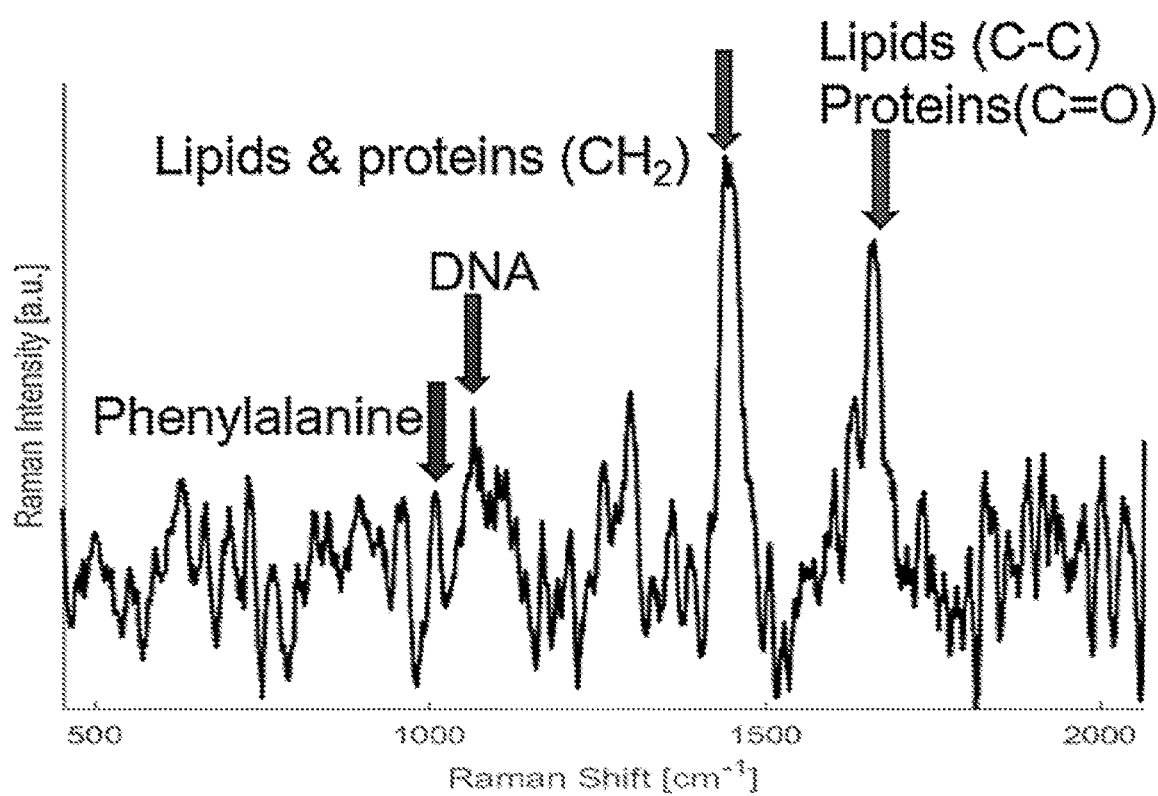
FIG. 9 shows a graphical representation of a Raman spectral signature with various biomarker peaks according to a method of Raman biomarker assessment of the present invention.
Figure 10:
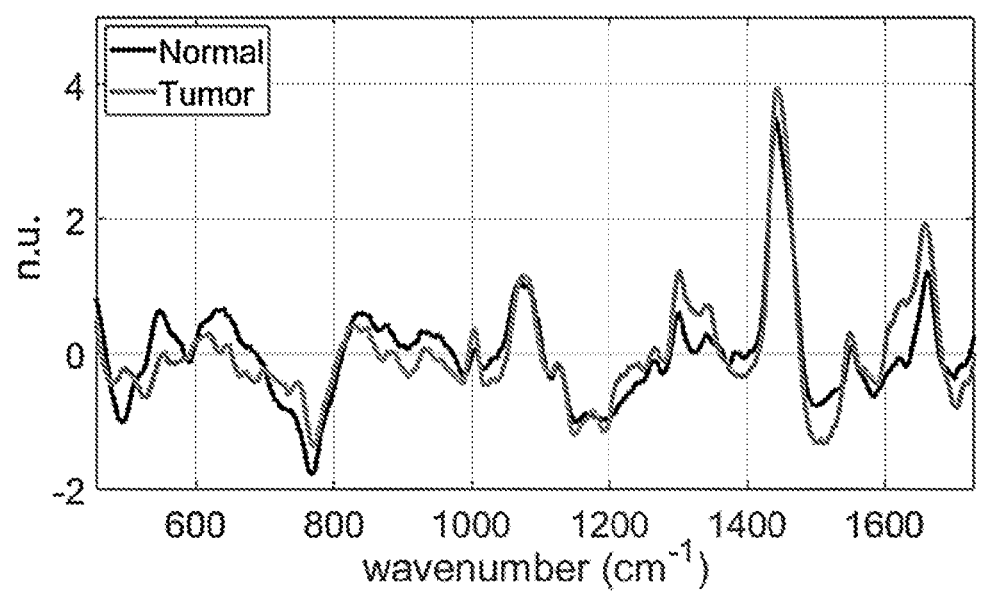
FIG. 10 shows a graphical representation of Raman spectra of normal and cancerous tissue according to a method of Raman feature extraction of the present invention.

First, we take the optimized feature vector $\vec{FV}_{opt}$, then introduce a pivot parameter p that adaptively controls the width of the significant bands as shown in FIG. 8. The width is adaptively increased or decreased around the pivot point by checking the performance measures with each change in the width using the leave-one-out-cross-validation technique. FIG. 8 shows an example of usage of the pivot parameter p while the performance outcomes for each width of the selected band is shown in FIG. 9. Peak performance is clearly evident for a band width of 22 wavenumbers.

Figure 15:
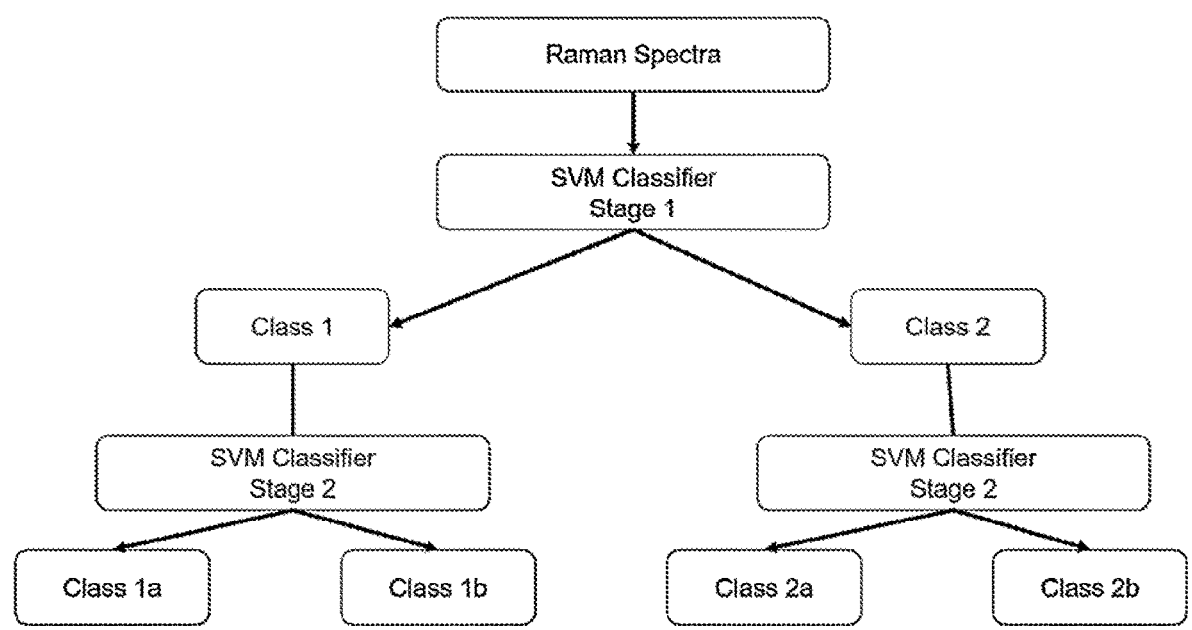
FIG. 15 shows a block diagram representing a support vector mechanism-based multistage classifier approach according to a method of the present invention.

Given that in our application, there could be multiple sub-types of cancers cells, we use the most practical technique in practice to build a multi-class machine learning technique in multi-layer cascaded formulation. By example, classification techniques such as AdaBoost, logistic regression, support vector machines, (SVM), boosted trees Artificial Neural Networks with bootstrapped training dataset in a cascaded structure are suitable candidates. The idea is to build one classifier for one-versus-rest and use a cascading structure in a simple decision tree-like network to arrive at a novel and effective approach of solving the multi-class problem for different classes of cancer infiltrated brain tissue as shown in FIG. 15.

In our case, the first stage classifier is fine tuned to detect normal and tumor class (broadly). The tumor class is further divided into infiltrative tumors, tumors and necrotic tissues as an example. The inputs to subsequent stages are the unique classes derived from the unsupervised clustering technique.

The systems and methods of the present invention were applied to Raman data as follows. A total of 40 spectra were investigated which had pathological label belonging to Normal (N), Tumor (T), Infiltrated (I) or necrotic classes. Necrotic class were not considered in this dataset because they were easy to identify, and we developed template matching technique to identify and reject necrotic tissues from becoming part of the training/test sets. In one embodiment. the trained SVM based classifier is tested on blind brain tumor dataset that was not considered in any aspect to build the models.

The results for in vivo human brain tissue are presented in Table 1 (training dataset). Classifier A is the first stage SVM classifier capable of two-class (normal or tumor) classification. Classifier B is a modified SVM classifier capable of 2-class (normal or tumor and infiltrated) classification. Classifier B treats the infiltrated class as tumor, hence we see a drop in all the performance parameters such as area under curve, accuracy, sensitivity and specificity. While Classifier C is multi-stage classifier. We observe that the performance is highly consistent with pathological labels with occasional misclassification that mainly occur due to poor input data.

TABLE 1

Performance analysis of training dataset

| TYPE | ACCURACY | SENSITIVITY | SPECIFICITY |
|---|---|---|---|
| CLASSIFIER A (N = 24, T = 13) | 100 | 84.6 | 94.5 |
| CLASSIFIER B (N = 24, T + I = 16) | 84.3 | 81.5 | 87.5 |
| CLASSIFIER C (N = 24, T + I = 16) | 97.6 | 100 | 96.1 |

Table 2 presents results from the test dataset of the tree-like multistage SVM cascaded classifier. A drop in the overall performance is observed. The drop-in performance does not truly reflect poor performance because we combined various sub-types into a few all infiltrated (no definite tumor+rare infiltrative samples <20% as Normal).

TABLE 2

Performance outcome on blind test dataset

| TYPE | ACCURACY | SENSITIVITY | SPECIFICITY |
|---|---|---|---|
| CLASSIFIER C (N = 24, T + I = 16) | 84 | 89 | 90 |

What is claimed is:

1. A method of detection of cancerous tissue using Raman spectroscopy comprising:
   determining, for a tissue type of interest, an excitation power and/or an excitation exposure time of a laser light source to maximize a range of a charge-coupled device (CCD) detector based on real-time Raman measurements obtained when the laser light source operates at predetermined excitation power and/or excitation exposure time settings, the CCD detector for acquiring Raman data;
   acquiring the Raman data in situ during surgery from the tissue type of interest when the laser light source operates according to the determined excitation power and/or excitation exposure time to excite the tissue type of interest;

assessing a quality of the Raman data and, on the basis of the quality assessment, excluding Raman data that does not meet predetermined quality standards;

for Raman data that has met the predetermined quality standards, computing signal-to-noise ratio and excluding Raman data with insufficient signal-to-noise ratio, wherein computing the signal-to-noise ratio comprises computing a corresponding signal quality at predetermined spectral locations, selected based on the tissue type of interest;

for Raman data that has sufficient signal-to-noise ratio, extracting Raman data features that have been determined to have high significance in separating cancerous from normal tissue in the tissue type of interest;

classifying the Raman data according to relative values of the extracted features; and providing an answer as to whether the Raman data indicates that the tissue type of interest is cancerous; wherein the preceding steps are all carried out in real time during surgery.

2. The method of claim 1, wherein real time is 1 second or less.

3. The method of claim 1, wherein the signal-to-noise ratio is calculated from a single Raman spectrum.

4. The method of claim 1, wherein the signal-to-noise ratio is calculated using a formula that approximates different constituents of Raman signal and noise at each predetermined spectral location.

5. The method of claim 1 wherein the data quality assessment comprises detection of cosmic rays, ambient light contamination, saturation levels, low signal levels and high background levels.

6. The method of claim 5, wherein the data quality assessment allows for the implementation of correction of cosmic ray interference.

7. The method of claim 1, wherein the tissue type is brain tissue.

8. A real-time Raman spectroscopy system comprising:
a laser light source;
excitation fibers;
collection fibers;
a spectrometer;
a charge-coupled device (CCD) detector; and
a data processing module for controlling the laser light source and the CCD and processing acquired Raman data comprising at least one processor operable to:
determine, for a tissue type of interest, an excitation power and/or an excitation exposure time of the laser light source to maximize a range of the CCD detector based on real-time Raman measurements obtained when the laser light source operates at predetermined excitation power and/or excitation exposure time settings;

acquire, using the CCD, Raman data in situ during surgery from the tissue type of interest, when the laser light source operates according to the determined excitation power and/or excitation exposure time;

assess a quality of the Raman data and, on the basis of the quality assessment, excluding Raman data that does not meet predetermined quality standards;

for Raman data that has met the predetermined quality standards, compute signal-to-noise ratio and excluding Raman data with insufficient signal-to-noise ratio, wherein computing the signal-to-noise ratio comprises computing a corresponding signal quality at predetermined spectral locations selected based on the tissue type of interest;

for Raman data that has sufficient signal-to-noise ratio, extract Raman data features that have been determined to have high significance in separating cancerous from normal tissue in the tissue type of interest;

classify the Raman data according to relative values of the extracted features; and provide an answer as to whether the Raman data indicates that the tissue type of interest is cancerous;

wherein the at least one processor is configured to carry out all of the preceding steps in real time during surgery.

9. The real-time Raman spectroscopy system of claim 8, wherein real time is 1 second or less.

10. The real-time Raman spectroscopy system of claim 8, wherein the signal-to-noise ratio is calculated from a single Raman spectrum.

11. The real-time Raman spectroscopy system of claim 8, wherein the signal-to-noise ratio is calculated using a formula that approximates different constituents of Raman signal and noise at each predetermined spectral location.

12. The real-time Raman spectroscopy system of claim 8, wherein the data quality assessment comprises detection of cosmic rays, ambient light contamination, saturation levels, low signal levels and high background levels.

13. The real-time Raman spectroscopy system of claim 12, wherein the data quality assessment allows for the implementation of correction of cosmic ray interference.

14. The real-time Raman spectroscopy system of claim 8, wherein the tissue type is brain tissue.

* * * * *